(12) United States Patent
Yelton

(10) Patent No.: US 8,245,437 B1
(45) Date of Patent: Aug. 21, 2012

(54) FISHING LURE

(76) Inventor: James Joseph Yelton, Rushsylvania, OH (US)

( * ) Notice: Subject to any disclaimer, the term of this patent is extended or adjusted under 35 U.S.C. 154(b) by 0 days.

(21) Appl. No.: 12/931,965

(22) Filed: Feb. 15, 2011

(51) Int. Cl.
*A01K 85/14* (2006.01)

(52) U.S. Cl. .......................................... 43/42.5; 43/42.32

(58) Field of Classification Search ........... 43/42, 42.32, 43/42.34, 42.19, 42.11, 42.15, 42.5, 42.51, 43/42.52, 42.45, 42.12, 42.13, 42.14, 42.16, 43/42.17, 42.18, 42.2, 42.21; *A01K 85/00, A01K 85/14, 85/10*
See application file for complete search history.

(56) References Cited

U.S. PATENT DOCUMENTS

| | | | | |
|---|---|---|---|---|
| 2,575,609 A | * | 11/1951 | Alderman | 43/42.22 |
| 3,805,436 A | * | 4/1974 | Davis | 43/42.35 |
| 3,881,271 A | * | 5/1975 | Jacura | 43/42.5 |
| 4,951,413 A | * | 8/1990 | Blevins et al. | 43/43.13 |
| 5,367,816 A | * | 11/1994 | Gabos et al. | 43/42.5 |
| 5,918,406 A | * | 7/1999 | Wilson | 43/42.28 |
| 6,058,643 A | * | 5/2000 | Marusak et al. | 43/42.11 |
| 7,216,456 B2 | * | 5/2007 | Kaariainen et al. | 43/42.5 |

* cited by examiner

*Primary Examiner* — Darren W Ark
*Assistant Examiner* — Lisa Tsang
(74) *Attorney, Agent, or Firm* — Standley Law Group LLP

(57) ABSTRACT

A fishing lure having a bent half-moon shape body. The top portion of the fishing lure has a plurality of attachments points for hooks and lines and circular stamp resembling an eye. The bottom portion of the fishing lure is angled relative to the top portion.

11 Claims, 1 Drawing Sheet

FISHING LURE

TECHNICAL FIELD

Exemplary embodiments of the present invention relate to a fishing lure. More particularly, the present invention relates to a fishing lure having attachment points for hooks and a bent body to imitate the natural prey of fish.

BACKGROUND

Man has endeavored for centuries to master the art of fishing. Accordingly, man has sought out innovative methods and devices in order to ensure a productive day of fishing. Devices in use range from carefully crafted flies to artfully painted lures. With each advancement in fishing technology comes increased specialization and increased cost. As such, there is a need for a cheap multipurpose fishing lure.

SUMMARY OF THE INVENTIVE CONCEPT

Exemplary embodiments of the present invention provide individuals with a cheap and effective fishing lure. The fishing lure embodying the inventive concept has a body having a bent half-moon configuration. The body has a top portion and a bottom portion. The bottom portion encompasses the rounded portion of the half-moon shape. Holes are drilled into the top portion to allow the attachment of hooks and line. To increase the lures attractiveness to fish an eye may be stamped into both sides of the lure to further mimic the natural prey of fish.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
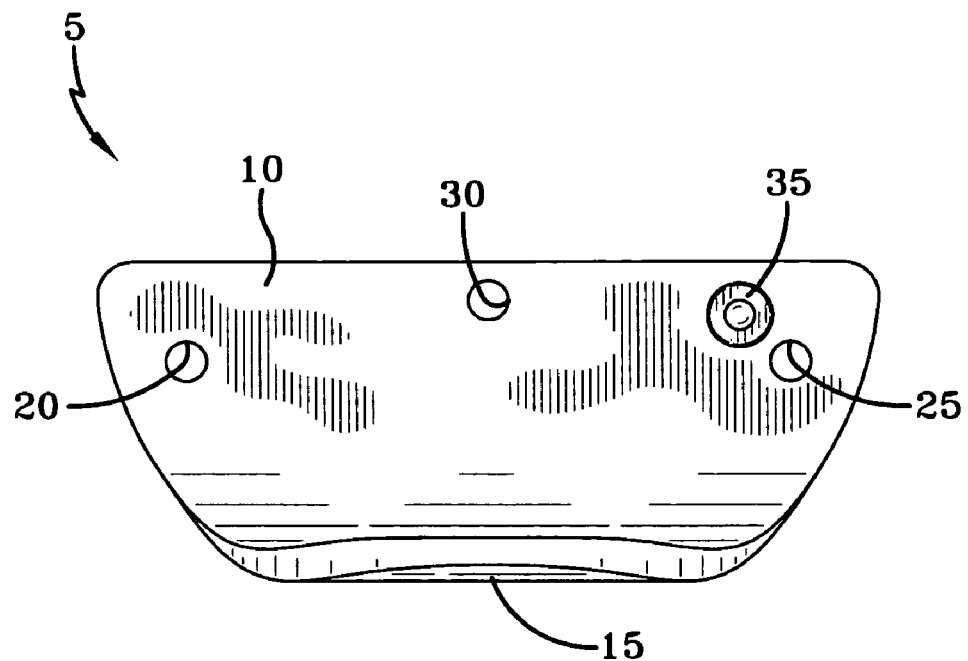
FIG. 1 is a front view of an exemplary embodiment of a fishing lure of the present invention.
Figure 2:
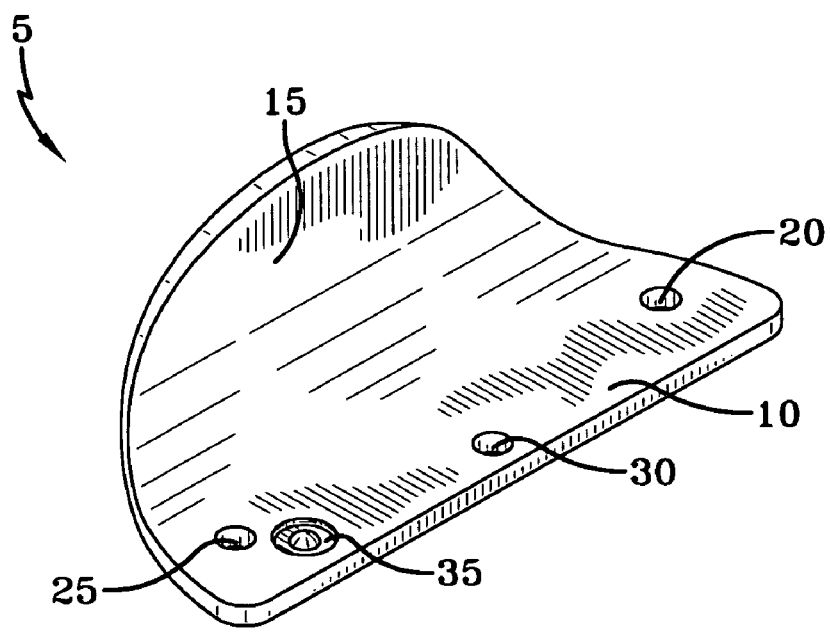
FIG. 2 is a top perspective view of a fishing lure of the present invention.

As shown in FIGS. 1 and 2, the lure 5 is constructed from a half-moon piece of metal. As should be understood by those of skill in the art various types of metals may be used to construct the lure 5. As illustrated in FIGS. 1 and 2, the lure 5 has a top portion 10 and a bottom portion 15. The bottom portion 15 is the rounded portion of the half-moon shape and represents approximately 40% to about 50% of the height of the lure 5. To accomplish the desired movement in the water, the bottom portion 15 should be bent at about a 70 degree to 90 degree angle relative to the top portion 10. This bend configuration allows the lure 5 to replicate the movement of live bait in order to attract fish.

To allow the attachment of hooks and lines to the lure 5, a series of holes 20, 25, 30 are placed in the lure 5. The holes 20, 25, 30 are located in the top portion 10 of the lure 5. The first hole 20 and the second hole 25 are located near each corner of the top portion 10 and the third hole 30 is centrally located in the top end of the top portion 10. As should be understood by those having skill in the art, hooks and lines may be attached to the holes 20, 25, 30 in a variety of configurations. Different hook and line configurations may impart different lure 5 movements in the water.

In addition to the movement of the lure 5 caused by the bent shape, the lure 5 may have a feature mimicking an eye stamped into the top portion 10. In such embodiments, the eye 35 is stamped into the metal along at least one edge of the top portion 10, as shown in FIGS. 1 and 2. The eye 35 may be stamped on to both sides of the lure 5 to increase its visibility to passing fish.

Another feature of lure 5 is the ease of its manufacture. The lure 5 may start out as a large flat piece of metal. The half-moon shape may be cut from this flat piece of metal, resulting in a semi-circular piece of metal. Next, the holes 20, 25, 30 may be drilled in to the top portion 10 of the lure 5. The placement of the bend is then determined. As stated above, the bend is located so that the bent material represents approximately 40% to about 50% of the height of flat half-moon piece of metal. After the bend location has been determined, the flat piece of metal is bent so that the bottom portion 15 is at a 70 degree to about 90 degree angle relative to the top portion 10. The eyes 35 are then punched into the lure 5.

While certain embodiments of the present invention are described in detail above, the scope of the invention is not to be considered limited by such disclosure, and modifications are possible without departing from the spirit of the invention as evidenced by the following claims:

What is claimed is:

1. A fishing lure comprising:
   a metal body, said metal body having a semi-circular shape, said semi-circular shape having a curved edge having ends and a straight edge connecting said ends, said curved edge being half the circumference of a circle;
   a bend in said metal body separating a top portion from a bottom portion of said metal body, said bottom portion including about 40% to about 50% of said metal body, said bottom portion is angled relative to said top portion; and
   a plurality of attachment points in said top portion.

2. The fishing lure of claim 1, wherein said top portion has a front side and a back side.

3. The fishing lure of claim 1, wherein said bottom portion is at a 70 degree to 90 degree angle relative to said top portion.

4. The fishing lure of claim 1, wherein at least one of said plurality of attachment points is centrally located in a top end of said top portion.

5. The fishing lure of claim 1, wherein at least two of said plurality of attachment points are oppositely positioned on said top portion.

6. The fishing lure of claim 1, further comprising a circular stamp in a front side and a back side of said top portion.

7. The fishing lure of claim 6, wherein said circular stamp is positioned near at least one of said plurality of attachment points.

8. The fishing lure of claim 1, wherein said bottom portion includes said curved edge.

9. The fishing lure of claim 1, wherein said plurality of attachment points are apertures defined by said top portion.

10. A fishing lure, comprising:
    a semi-circular body, said semi-circular body having a curved edge having ends and a straight edge connecting said ends, said curved edge being half the circumference of a circle;
    a bend in said semi-circular body separating a top portion from a bottom portion of said semi-circular body, said top portion being flat and having said straight edge opposite said bend, said bottom portion being flat and having said curved edge, said bend having an angle of about 70 to about 90 degrees;
a plurality of attachment points located in said top portion; and
a circular stamp located in said top portion.

11. A fishing lure comprising:
a metal body, said metal body having a semi-circular shape, said semi-circular shape having a curved edge having ends and a straight line connecting said ends, said curved edge being half the circumference of a circle;
a bend in said metal body separating a top portion from a bottom portion of said metal body, said bend located so that about 40% to about 50% of said bottom portion of said metal body is positioned below said bend, said bottom portion having a 70 degree to about 90 degree angle relative to said top portion;
a first attachment point centrally located in a top end of said top portion, said top portion having a first and a second corner;
a second attachment point and a third attachment point positioned in each said corner of said top portion respectively; said first, second, and third attachment points are apertures in said top portion; and
a circular stamp in said top portion, said circular stamp positioned near at least one of said second and third attachment points.

* * * * *